United States Patent
Le Bodic et al.

(10) Patent No.: US 7,181,231 B2
(45) Date of Patent: Feb. 20, 2007

(54) SYSTEM OF INTEROPERABILITY BETWEEN MMS MESSAGES AND SMS/EMS MESSAGES AND AN ASSOCIATED EXCHANGE METHOD

(75) Inventors: Gwenaél Le Bodic, Puteaux (FR); Jean-Luc Ricoeur, Paris (FR)

(73) Assignee: TCL Communication Technology Holdings Limited, Hong Kong (HK)

( * ) Notice: Subject to any disclaimer, the term of this patent is extended or adjusted under 35 U.S.C. 154(b) by 396 days.

(21) Appl. No.: 10/218,580

(22) Filed: Aug. 15, 2002

(65) Prior Publication Data

US 2003/0040300 A1 Feb. 27, 2003

(30) Foreign Application Priority Data

Aug. 27, 2001 (FR) .................................. 01 11131

(51) Int. Cl.
*H04Q 7/20* (2006.01)
(52) U.S. Cl. .................. 455/466; 455/426.1; 370/316; 370/349; 709/230
(58) Field of Classification Search ................ 455/466, 455/412.1, 566, 426.1; 709/230, 247; 370/352, 370/316, 349; 379/114.26
See application file for complete search history.

(56) References Cited

U.S. PATENT DOCUMENTS

| | | | |
|---|---|---|---|
| 6,295,292 B1 * | 9/2001 | Voit et al. ................... 370/352 |
| 6,947,738 B2 * | 9/2005 | Skog et al. ............... 455/426.1 |
| 2002/0019243 A1 * | 2/2002 | Zhang et al. ................ 455/466 |
| 2002/0077134 A1 * | 6/2002 | Mizell et al. ............... 455/466 |
| 2002/0169883 A1 * | 11/2002 | Bright et al. ............... 709/230 |
| 2003/0003930 A1 * | 1/2003 | Allison et al. .............. 455/466 |
| 2005/0143136 A1 * | 6/2005 | Lev et al. ................... 455/566 |

FOREIGN PATENT DOCUMENTS

WO    WO 99/66746 A2    12/1999

OTHER PUBLICATIONS

3 GPP TS 23.140 V 4.3.0 releash 4, Universal Mobile Telecommunications System (UMTS) Multimedia Messaging Service (MMS), Functional Description, Jul. 24, 2001, pp. 55-68, XP002202092.
3 GPP TS 23.040 V 3.5.0, Universal Mobile Telecommunications System (UMTS), Technical Realization of the Short Message Service (SMS) Aug. 22, 2000, pp. 1-127, XP002202093.

* cited by examiner

*Primary Examiner*—Fan Tsang
*Assistant Examiner*—M S A Elahee
(74) *Attorney, Agent, or Firm*—Morgan, Lewis & Bockius LLP

(57) ABSTRACT

A message system is associated with a message domain which includes a mobile radio network, a message server conforming to a first standard referred to as the Enhanced Message Service and/or Short Message Service standard and/or a message server conforming to a second standard referred to as the Multimedia Message Service standard. The message domain further includes a message gateway which includes a database including a table of message profiles of terminals belonging to the message domain and is able to convert a message sent in accordance with the first standard into a message in accordance with the second standard.

2 Claims, 6 Drawing Sheets

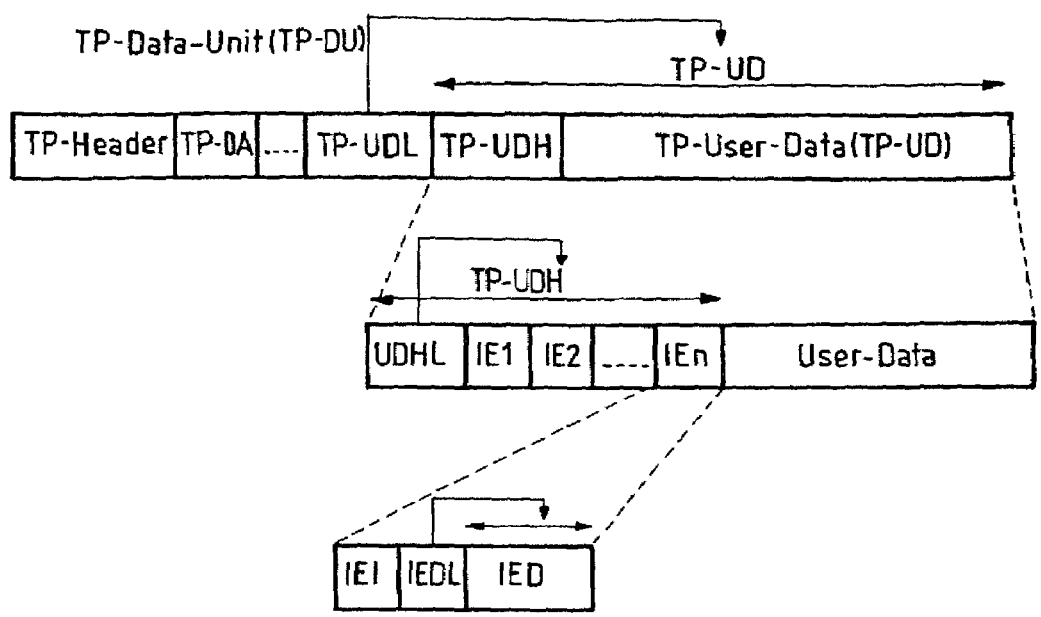
FIG_1
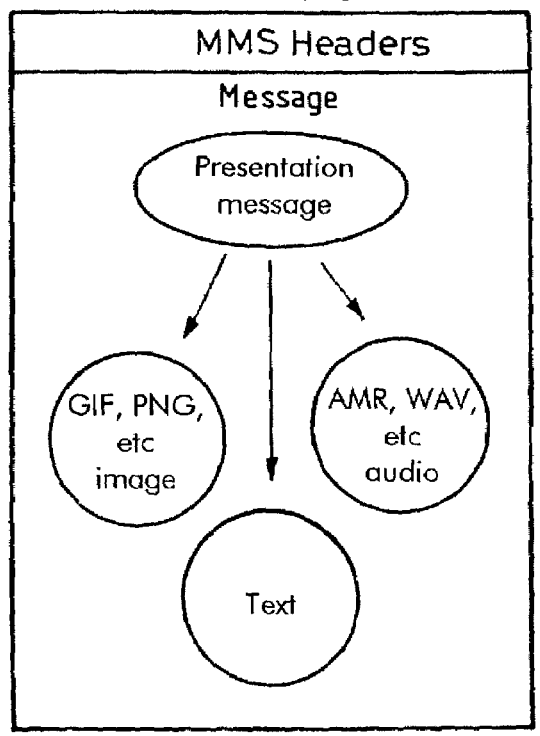
FIG_2

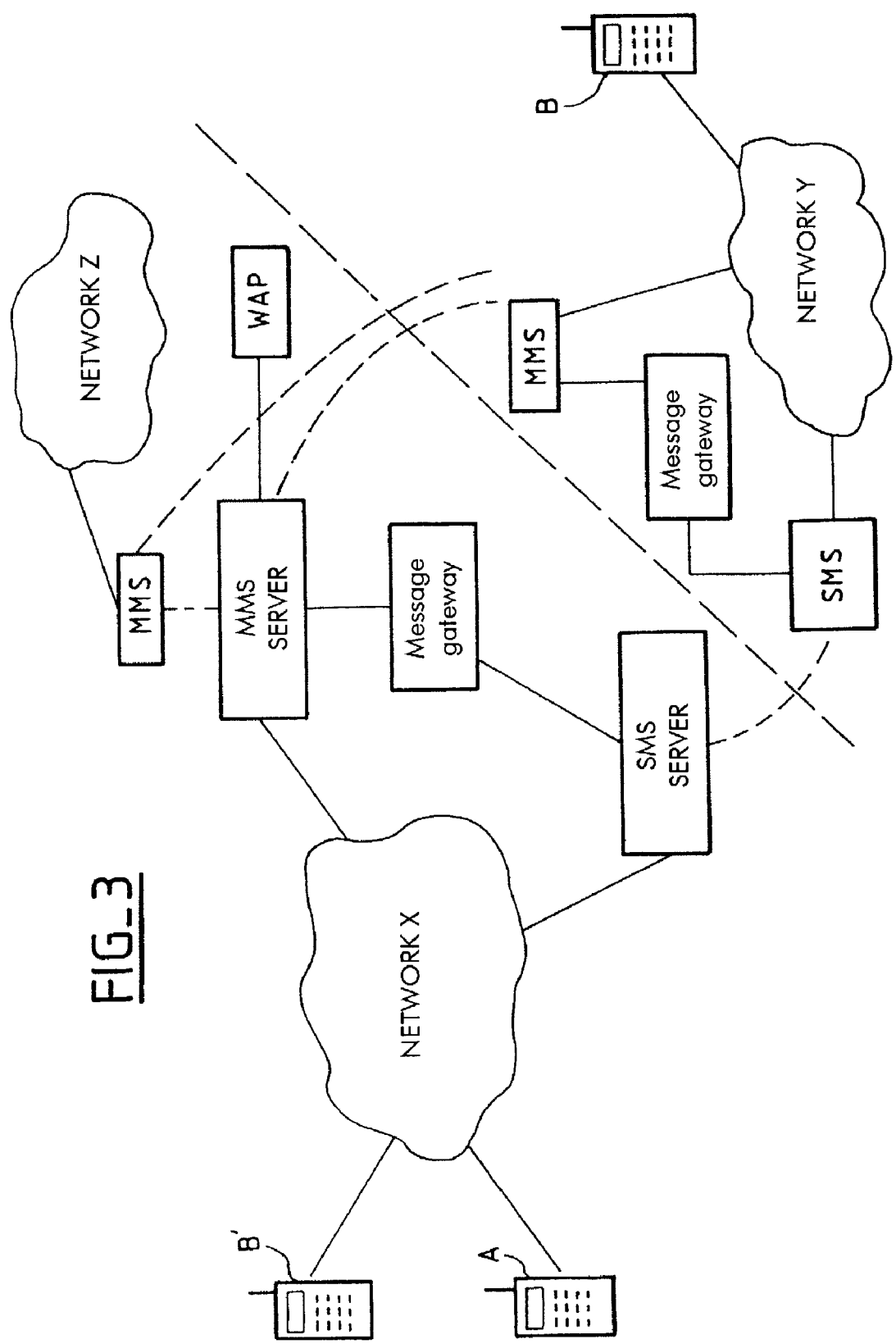
FIG_3

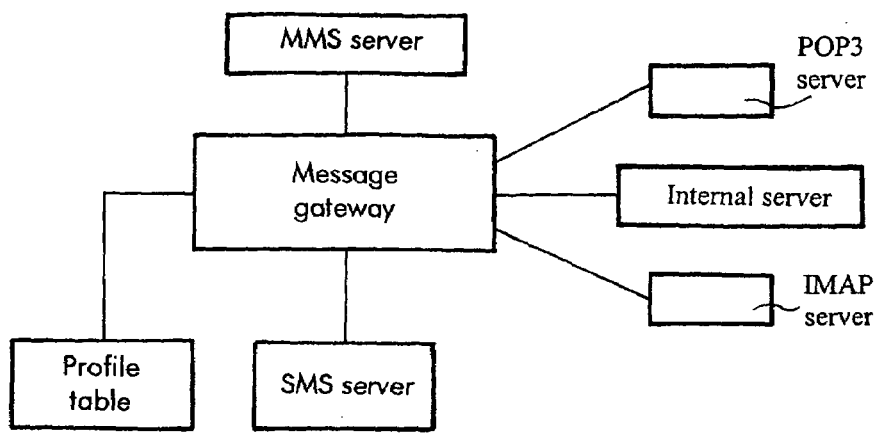
FIG_4
FIG_5
PROFILE TABLE
| M.E.Id | Message profile | Message server |
|---|---|---|
| aaa | SMS | SC SMS |
| bbb | EMS (Rel 4) | SC SMS |
| ccc | EMS (Rel 5) | SC SMS |
| ccc | MMS | SR MMS |
| ddd | MMS | SR MMS |
| eee | POP | POP server |

FIG_6a
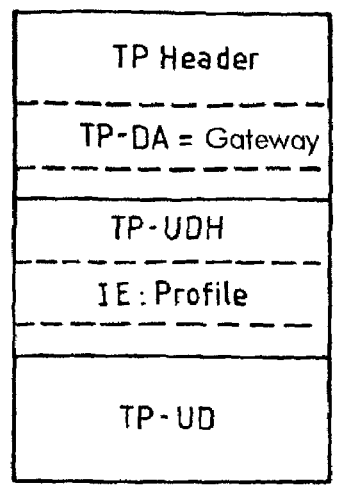
FIG_6b
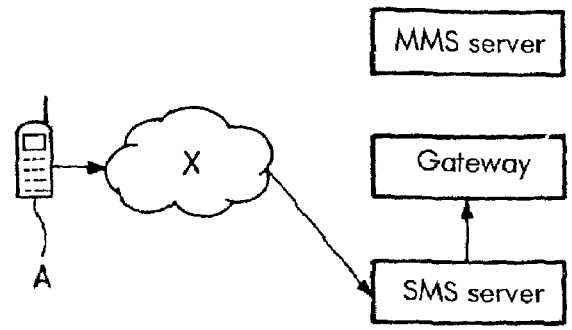
FIG_7
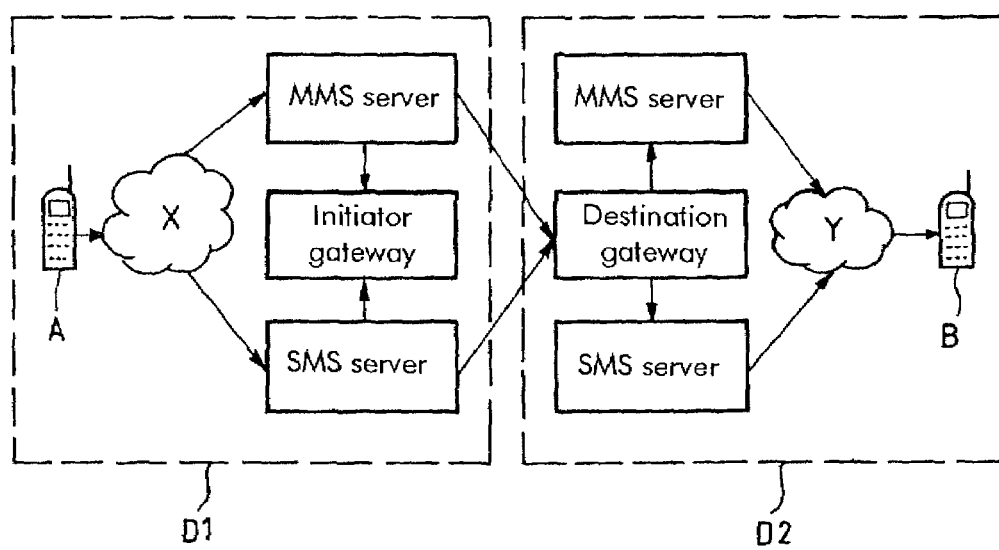

FIG_8a
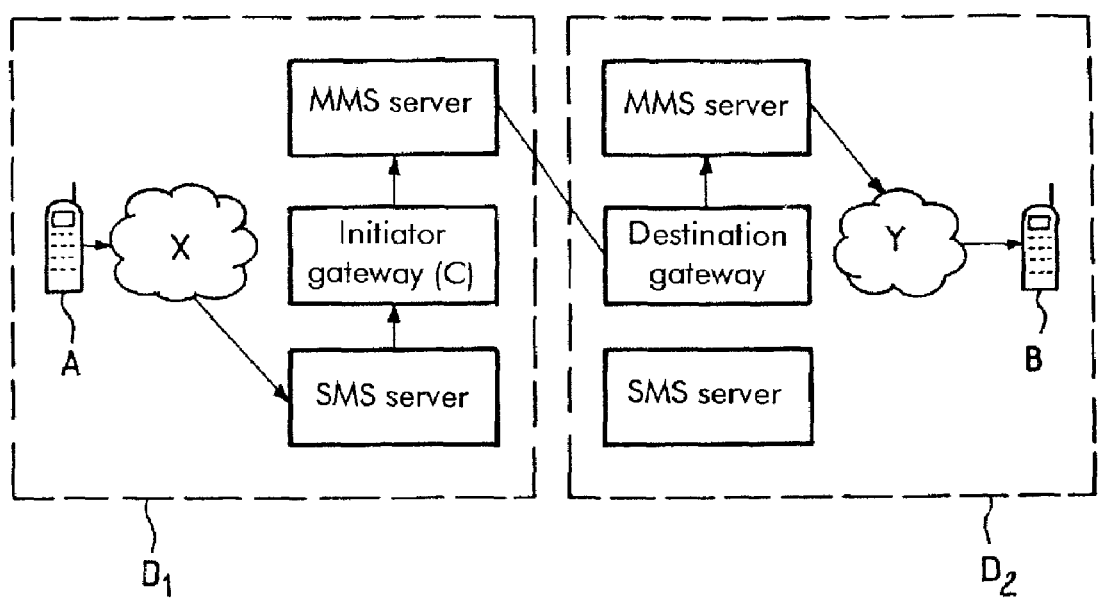
FIG_8b
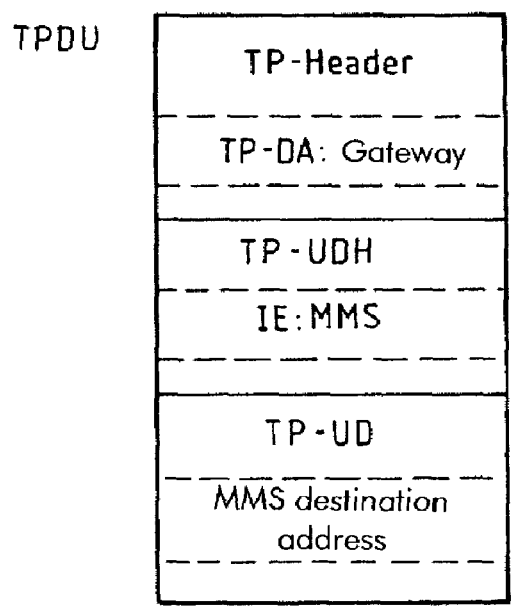

FIG_9
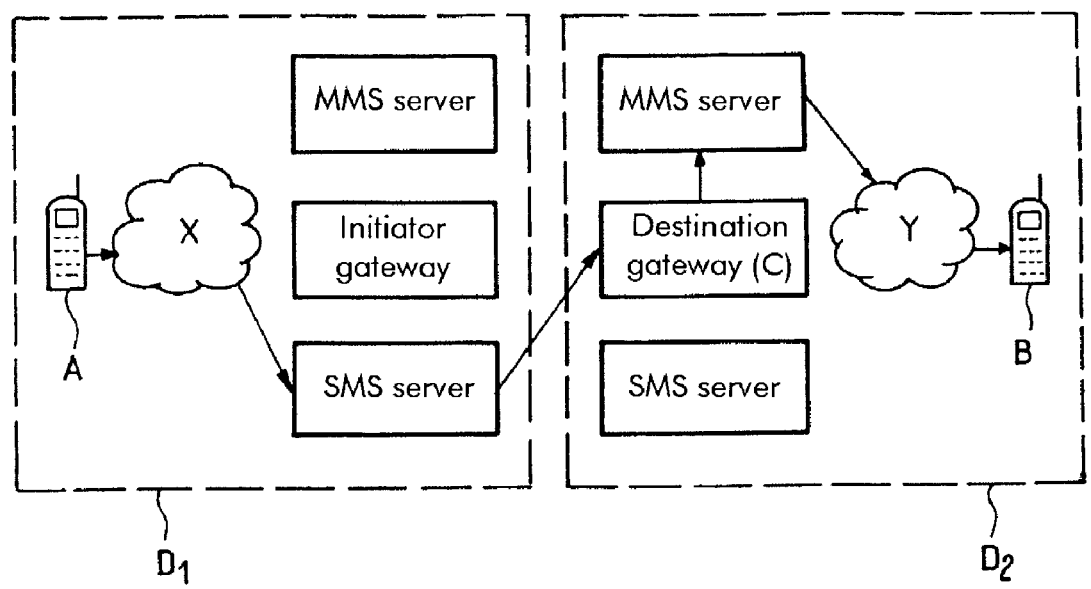
FIG_10
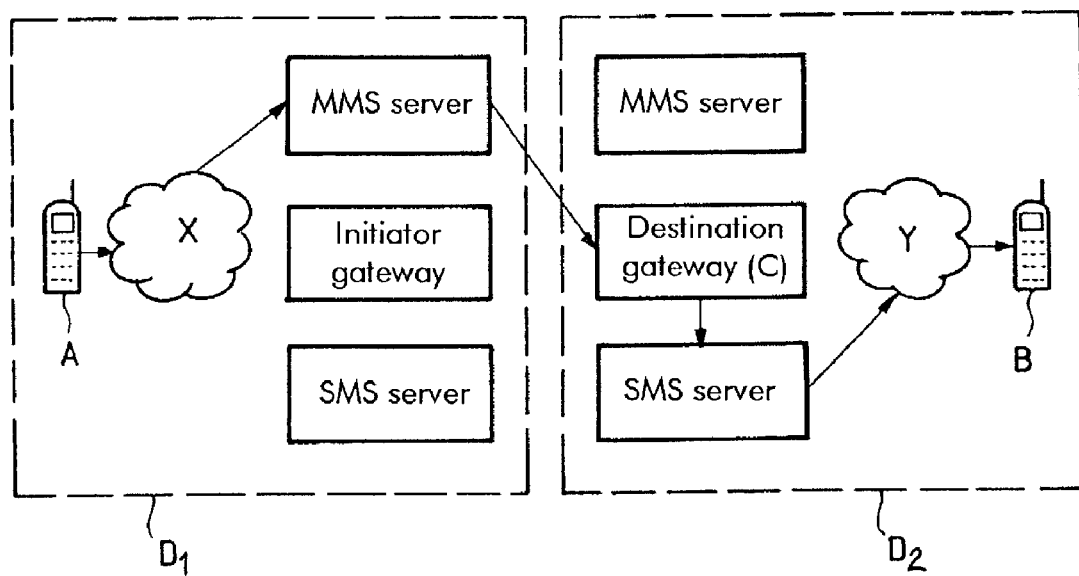

US 7,181,231 B2

SYSTEM OF INTEROPERABILITY BETWEEN MMS MESSAGES AND SMS/EMS MESSAGES AND AN ASSOCIATED EXCHANGE METHOD

CROSS-REFERENCE TO RELATED APPLICATIONS

This application is based on French Patent Application No. 01 11 131 filed Aug. 27, 2001, the disclosure of which is hereby incorporated by reference thereto in its entirety, and the priority of which is hereby claimed under 35 U.S.C. § 119.

BACKGROUND OF THE INVENTION

1. Field of the Invention

The present invention relates to messages sent and/or received by mobile radio terminals such as mobile telephones.

2. Description of the Prior Art

The exchange of Short Message Service (SMS) short messages has grown considerably in recent times. Conventionally, an SMS comprises a transport protocol data unit (TPDU), shown diagrammatically in FIG. 1.

The TPDU includes a transport protocol (TP) header associated with the transport protocol used and TP user data. The TP header contains transmission information such as the destination address (TP-DA), which can be a telephone number or an electronic address, for example, the identification of the transport protocol used, which can be a file, hypertext, radio or other transport protocol, the length of the data of the message (TP-UDL), and other information relating to the routing of the message, such as the time, the presence of a header in the data, etc. Some of this information is mandatory and some is optional. The SMS message data (TP User Data) includes a user data header (TP-UDH) followed by the message itself, referred to as the user data (TP-UD).

As initially developed, short messages included only text, without any multimedia data such as music or pictures, for example, and did not contain a great deal of information. Accordingly, a single data unit (TPDU) was able to transport the information to be transmitted. However, the development of Enhanced Message Service (EMS) short messages has recently expanded and has led to the issuing of a recommendation on this subject in the form of the SMS standard 3GPP TS 23.040. An enhanced message can contain much more information, which generally makes it essential to concatenate data units (TPDU) to transmit EMS via a mobile radio network.

In an EMS message, the data header (TP-UDH) includes an indication of the length of the header (UDHL) and at least one information element (IEI) followed by the data of the message (User Data). The information elements IE can contain multimedia data to be associated with the EMS enhanced message. Each information element IE contains an identification field (IEI) followed by a field (IEDL) indicating the length of the element followed by the data of the element (IED). Accordingly, the text (User Data) of the EMS message contains calls to the various IE defined in the header to be integrated into the data of the message transmitted.

A new type of message has recently been developed, known as Multimedia Messaging Service (MMS) messages. MMS messages, which are shown diagrammatically in FIG. 2, have a transmission protocol and a structure completely different from those of SMS and EMS messages, and are standardized in 3GPP Recommendation TS 23.140. MMS messages have a structure defined by the IETF (in RFC 2045) consisting in a Multipurpose Internet Mail Extensions (MIME) file format, with a header and a message body that can contain pictures, music, text and a presentation of graphical elements on the screen as well as temporal synchronization of some elements. An MMS message can include much denser multimedia data than an EMS message and provide richer multimedia presentations, of the type available on computers, for example. MMS messages are generally transmitted in accordance with the wireless application protocol (WAP).

The exchange of MMS messages presupposes the presence in the mobile radio network of a particular server dedicated to MMS messages which is separate from the server dedicated to SMS and EMS messages. Furthermore, the sending and/or receiving of MMS messages by a terminal is conditional on the installation of particular application software necessitating the allocation of high memory and processing capacities. Low-cost terminals and terminals of an older generation cannot support an application of this kind, although they can exchange SMS and EMS messages.

The use of MMS messages is therefore restricted to terminals which are capable of supporting this kind of application, which significantly reduces the interest in exchanging such messages and is retarding the growth of this new type of message. Moreover, some terminals incorporate the MMS application but reject the EMS application, although they retain the possibility of exchanging SMS.

Furthermore, different versions of EMS messages have already been developed, later ones generally being compatible with earlier ones. Nevertheless, sending an EMS message from a terminal integrating a new version (for example release 5) to a terminal having only the old version (for example release 4) can lead to defective display of the content of the message.

An objective of the invention is therefore to address the problem of interworking between the MMS message system and the SMS/EMS message system, as well as between different versions of the EMS message system, by proposing to adapt the content of messages transmitted to suit the reception possibilities of the terminal to which the message is addressed.

SUMMARY OF THE INVENTION

To be more specific, the invention provides a method of exchanging messages between a first mobile terminal which is part of a first message domain and at least one second mobile terminal which is part of a second message domain, each domain including at least one mobile radio network, one message server conforming to a first standard, referred to as the enhanced message service/short message service standard, and/or one message server conforming to a second standard, referred to as the multimedia message service standard, which method includes the following steps:

initiation of a message conforming to the first standard from a first terminal to at least one second terminal not compatible with the first standard to which the initiated message conforms;

transmission of the message by the message server conforming to the first standard to a message gateway including a database comprising a table of message profiles of terminals belonging to a message domain with which the gateway is associated;

conversion by the message gateway of the initiated message conforming to the first standard into a message conforming to the second standard supported by the destination terminal;

transmission of the converted message conforming to the second standard by the message gateway to the message server conforming to the second standard; and delivery of the message conforming to the second standard by the server conforming to the second standard to the destination terminal.

In a first embodiment of the invention an initiated message conforming to the first standard is converted into a message conforming to a second standard by the message gateway of the second domain of the destination terminal and the gateway determines the message standard or standards supported by the destination terminal listed in its table of message profiles.

In a second embodiment of the invention an initiated message conforming to the first standard is converted into a message according to the second standard by the message gateway of the first domain of the terminal which initiated the message, the message conforming to the first standard including the address of the gateway in a header and including an information element indicating that data conforming to the second standard is included in the data of the message conforming to the first standard, the conversion of the message including extraction of the data conforming to the second standard.

In one application of the invention the conversion is from a message conforming to a first version of the first standard to a message conforming to a second version of the first standard.

According to one feature of the invention the table of profiles contained in the message gateway of a message domain is updated by sending from a terminal listed in the table to the message gateway an update short message including an information element containing the message profile or profiles of the terminal.

In a first embodiment of the invention the table of profiles is updated automatically by the terminal at the time of a change of its message processing capacities.

In a second embodiment of the invention the table of profiles is updated at the command of a user of the terminal.

In one application of the invention the message domains of the terminal initiating the message and the terminal to which the message is addressed are one and the same.

The present invention also provides a message system associated with a message domain which includes a mobile radio network, a message server conforming to a first standard referred to as the Enhanced Message Service and/or Short Message Service standard and/or a message server conforming to a second standard referred to as the Multimedia Message Service standard, and a message gateway which includes a database including a table of message profiles of terminals belonging to the message domain and is able to convert a message sent in accordance with the first standard into a message in accordance with the second standard.

According to one feature of the invention the message gateway connects the message server conforming to the first standard and the message server conforming to the second standard of the same domain.

According to another feature of the invention the message gateway of a first domain is connected to the message gateway of a second domain.

The invention defines a Short Message Service short message initiated by a mobile radio terminal and containing user data including a header including information elements and a data text, wherein each information element includes an identification field followed by a field indicating the length of the data of the information element followed by the data of the information element and the header includes a profile information element whose identifier is associated with the updating of a message profile and whose data indicates the message standard or standards supported by the terminal which initiated the message.

The invention also defines an Enhanced Message Service enhanced message initiated by a mobile radio terminal and including user data including a header including information elements and a data text, wherein each information element includes an identification field followed by a field indicating the length of the data of the information element followed by the data of the element and the header includes a Multimedia Message Service information element whose identifier indicates the presence of Multimedia Message Service information in the data of the message whose data indicates the length of the Multimedia Message Service information, which includes at least one Multimedia Message Service message header.

The features and advantages of the present invention will be understood better after reading the following description, which is given by way of illustrative and non-limiting example, and with reference to the accompanying drawings.

BRIEF DESCRIPTION OF THE DRAWINGS

FIG. 1, already described, shows diagrammatically the structure and parameters of an SMS/EMS message.

FIG. 2, already described, shows diagrammatically the structure of an MMS message.

FIG. 3 shows diagrammatically a message system associated with a given mobile radio network.

FIG. 4 shows diagrammatically a message gateway according to the invention.

FIG. 5 is an example of a table of profiles managed by a message gateway according to the invention.

FIG. 6*a* shows diagrammatically a profile indication SMS.

FIG. 6*b* shows diagrammatically the path taken by a message corresponding to a message profile update.

FIG. 7 shows diagrammatically all of the paths that a message could take.

FIG. 8*a* shows diagrammatically the path taken by a message corresponding to direct SMS/EMS to MMS sending.

FIG. 8*b* shows diagrammatically an EMS sent to a terminal able to receive only MMS messages.

FIG. 9 shows diagrammatically the path taken by a message corresponding to indirect SMS/EMS to MMS sending.

FIG. 10 shows diagrammatically the path taken by a message corresponding to direct MMS to SMS/EMS sending.

DETAILED DESCRIPTION OF THE PREFERRED EMBODIMENT

Referring to FIG. 3, mobile terminals A and B send and receive messages via a mobile radio network. The messages can be SMS or EMS messages, MMS messages, electronic messages (e-mail), or other messages. The mobile radio network transfers the messages from the sending terminal to the message server concerned. As a general rule, each mobile radio network has its own SMS server, which is in contact with the SMS servers of other networks and with its own MMS relay server, which is generally connected to a WAP connection gateway and is in contact with the MMS relay servers of other networks. On the other hand, there is no direct connection between the SMS server and the MMS server of the same network.

According to one essential feature of the invention, the message system of the network includes, over and above the dedicated SMS, MMS and other servers, a message gateway connected to said SMS and MMS servers, and possibly other servers.

The message gateway, which is shown diagrammatically in FIG. 4, manages interworking between different message systems, for example, although not exclusively, the SMS/EMS and MMS message systems. This kind of gateway includes links to a plurality of message servers conforming to different standards, for example an MMS server, an SMS server, a POP3 (Post Office Protocol) server, an IMAP (Internet Message Access Protocol) server, an Internet server or any other server.

The function of the message gateway is to convert messages exchanged in its domain from one standard to another, as and when required and as a function of the type of message sent and the reception capacities of the destination terminal. The expression "message domain" refers to all of the entities needed to provide a message service, i.e. at least one network, at least one message server (SMS and/or MMS server), and at least one message gateway.

In particular, the message gateway according to the invention contains a database comprising a table of profiles of terminals accessing the domain concerned. FIG. 5 shows one example of this kind of table. Each terminal is listed and its message profile specified and a given message server is associated with each profile.

Thus the terminal aaa supports only SMS short messages either because it is a low-cost terminal or one of an older generation or because the user of the terminal prefers to receive only that type of message. Any message sent to the terminal aaa will necessarily be routed to the SMS server after the message gateway has converted it to the SMS format if this was not its original format.

Similarly, the terminal ddd has application software only for exchanging MMS. Any message sent to this terminal ddd will necessarily be routed to the MMS server, after the message gateway has converted it to that format if it was not its original format. On the other hand, the terminal ccc can interpret MMS messages or EMS messages conforming to the "release 5" standard, whereas the terminal bbb can receive only "release 4" standard EMS messages, which may oblige the message gateway to convert a "release 5" standard EMS message before transferring it to the terminal bbb.

Other configurations for exchanging different types of messages can be envisaged, depending on the intended applications or the development of new message standards.

The message profile assigned to each terminal of a message domain in the profile table of the message gateway can be defined in various ways. In particular, the profile can be:

(1) predefined by the message service provider at the time of subscribing to said service, or
(2) updated at the explicit request of the user, or
(3) fixed automatically by the mobile terminal itself on detecting a change in the message processing capacity of the terminal.

The latter two update modes can be effected by sending an SMS to the message gateway, for example. To this end, as shown in FIGS. 6a and 6b, the SMS sent includes in its TP-DA the address of the gateway and advantageously contains in its data field a specific information element (IE) containing the message profile.

The terminal A sends the profile update SMS as a conventional SMS routed by the SMS server to the destination address, i.e. the message gateway. The latter is able to interpret an SMS of this kind and to update its profile data table appropriately by extracting from the SMS the parameter of the data field of the "profile" information element. The terminal A can send the profile update SMS message in a manner that is transparent for the user, or the message can be sent intentionally by said user, if his mobile equipment allows this. For example, a user whose terminal is technically able to receive MMS can decide to receive only SMS, or EMS if his terminal is able to, during a given period, for example because of roaming costs when traveling abroad, or for any other reason.

Several message exchange scenarios are described briefly hereinafter without prejudging their importance or their frequency of occurrence. FIG. 7 shows diagrammatically all the paths that any message can take. A terminal A is the initiator of a message in a first message domain $D_1$ comprising a mobile radio network X and including a message gateway and at least one SMS server and one MMS server. A terminal B to which the message is addressed is part of another message domain $D_2$ comprising a mobile radio network Y and including a message gateway and at least one SMS server and one MMS server. According to the invention, all messages entering a message domain, regardless of the message type, are received by the message gateway, which routes each message to the appropriate server of the destination domain.

It is to be understood that the domains $D_1$ and $D_2$ and the networks X and Y can be one and the same. Note, however, that the same message domain can contain a plurality of mobile radio networks, depending on the administration of the message system in question.

Consider first FIG. 8a, in which a terminal A is the initiator of an EMS message to a destination terminal B which supports only MMS messages, terminal A being aware of this limitation of the terminal B.

The terminal A initiating the EMS message knows that its destination is a terminal which supports only the MMS standard, and therefore includes the MMS address of this destination in its EMS message, as shown in FIG. 8b.

The EMS message sent then has the following features. On the one hand, the destination address (TP-DA) of the header (TP Header) of the EMS is the address of the message gateway of the message domain of the message initiator. On the other hand, the EMS message contains an information element in the user header (TP-UDH) indicating that the data of said message (TP-DU) contains MMS information, namely the address of the destination terminal. Accordingly, the message gateway of the domain of the terminal A initiating the message receives the EMS message, extracts the MSS address of the destination terminal B, and converts (C) the EMS message into a MIME format file message which can be interpreted by the destination terminal B, for example, by converting a bit map IE of the EMS message corresponding to pictures into gif or jpg files associated with the MMS message, or by converting a music IE of the EMS message into WAV files associated with the MMS message.

Consider now FIG. 9 in which a terminal A is the initiator of an EMS message to a destination terminal B which supports only MMS messages, terminal A being unaware of this limitation of terminal B.

The terminal A initiating the message sends it with no special precautions to the SMS server of its message domain D1 which transmits it to the destination domain $D_2$ of the terminal B. Incoming messages are systematically received by the message gateway, which consults its profile table. If the profile of the destination terminal B had been 'EMS', then the message would have been transferred directly to the SMS server for delivery of the destination terminal B. However, because the profile of the destination terminal B is 'MMS', the destination message gateway converts the EMS message into an MMS message before transmitting it to the MMS server of the destination domain $D_2$ for delivery to the destination terminal B.

Consider finally FIG. 10, in which a terminal A is the initiator of an MMS message to a destination terminal B which supports only SMS/EMS messages, whether terminal A is aware of this limitation of the terminal B or not.

The MMS message initiated by the terminal A is transmitted to the gateway of the message domain of the destination as explained for the preceding situation. The gateway of the destination domain $D_2$ consults the profile table to determine which message system the destination terminal B of the message supports. If the standard associated with the terminal B is the SMS/EMS standard, the message is converted to that standard and transferred to the SMS server identified in the profile table of the destination terminal B to be delivered by a conventional method.

Another situation, not shown explicitly, is the sending of an EMS message by an initiator terminal using application software more sophisticated than that of the destination terminal, which will not be in a position to process this kind of message, for example a destination terminal with the "EMS release 4" software unable to exploit all the data of an EMS initiated by a terminal with the "EMS release 5" software. In this situation, the EMS message is also transmitted by the SMS server of the message initiator to the message gateway of the destination domain. The destination message gateway checks which profiles the destination terminal supports and converts the message before sending it to the destination SMS server so that it can be transmitted to its destination in the correct format.

There is claimed:

1. A Short Message Service communication method, intended for use in communicating a short message initiated by a first mobile radio terminal which is part of a first message domain, and which is capable of exchanging messages with at least one second mobile terminal which is part of a second message domain, each domain including at least one mobile radio network, one first message server conforming to a first message standard, and/or one second message server conforming to a second, different message standard, wherein:

initiating a message, conforming to said first standard, from said first terminal to at least said second terminal not compatible with said first standard to which said initiated message conforms, but compatible with said second message standard;

transmitting said message by said first message server to a message gateway including a database comprising a table of message profiles of terminals belonging to said second message domain with which said gateway is associated, including said second terminal;

converting said initiated message, conforming to said first message standard, by said message gateway into a message conforming to said second message standard supported by said second terminal;

transmitting the converted message standard by said message gateway to said second message server; and delivering said converted message standard by said second message server to said second terminal, wherein, when said first message standard is EMS or SMS, said second message standard is MMS, and, when said first message standard is MMS, said second message standard is EMS or SMS; and wherein said table of profiles contained in said message gateway of said second message domain is updated by sending from said first mobile terminal listed in said table to said message gateway an update of the message including an information element containing the message profile or profiles of said terminal, wherein said message containing user data including a header including said information element and a data text, wherein said information element includes an identification field followed by a field indicating the length of the data of said information element followed by the data of said information element and said header includes a profile information element whose identifier is associated with the updating of a message profile and whose data indicates the message standard or standards supported by the terminal which initiated said message.

2. An Enhanced Message Service communication method, intended for use in communicating an enhanced message initiated by a first mobile radio terminal which is part of a first message domain, and which is capable of exchanging messages with at least one second mobile terminal which is part of a second message domain, each domain including at least one mobile radio network, one first message server conforming to a first message standard, and/or one second message server conforming to a second, different message standard, wherein:

initiating a message, conforming to said first standard, from said first terminal to at least said second terminal not compatible with said first standard to which said initiated message conforms, but compatible with said second message standard;

transmitting said message by said first message server to a message gateway including a database comprising a table of message profiles of terminals belonging to said initiated message domain with which said gateway is associated, including said second terminal;

converting said initiated message, conforming to said first message standard, by said message gateway into a message conforming to said second message standard supported by said second terminal;

transmitting the converted message standard by said message gateway to said second message server;

delivering said converted message standard by said second message server to said second terminal, wherein, when said first message standard is EMS or SMS, said second message standard is MMS, and, when said first message standard is MMS, said second message standard is EMS or SMS; and converting said initiated message conforming to said first message standard into a message according to said second message standard by said message gateway of said first domain of the first terminal which initiated said message, said initiated message including the address of said message gateway of said first domain in a header and including an information element indicating that data conforming to said second message standard is included in the data of said initiated message, said conversion of said initiated message including extraction of said data conforming to said second message standard;

wherein said enhanced message including user data includes a header with said information element and a data text, wherein said information element includes an identification field followed by a field indicating the length of the data of said information element followed by said data of said element and said header includes a Multimedia Message Service information element whose identifier indicates the presence of Multimedia Message Service information in said data of said message whose data indicates the length of said Multimedia Message Service information, which includes at least one Multimedia Message Service message header.

* * * * *